Jan. 24, 1939. A. C. ROUTH Re. 20,987
ICE CREAM MANUFACTURING APPARATUS
Original Filed Dec. 10, 1935
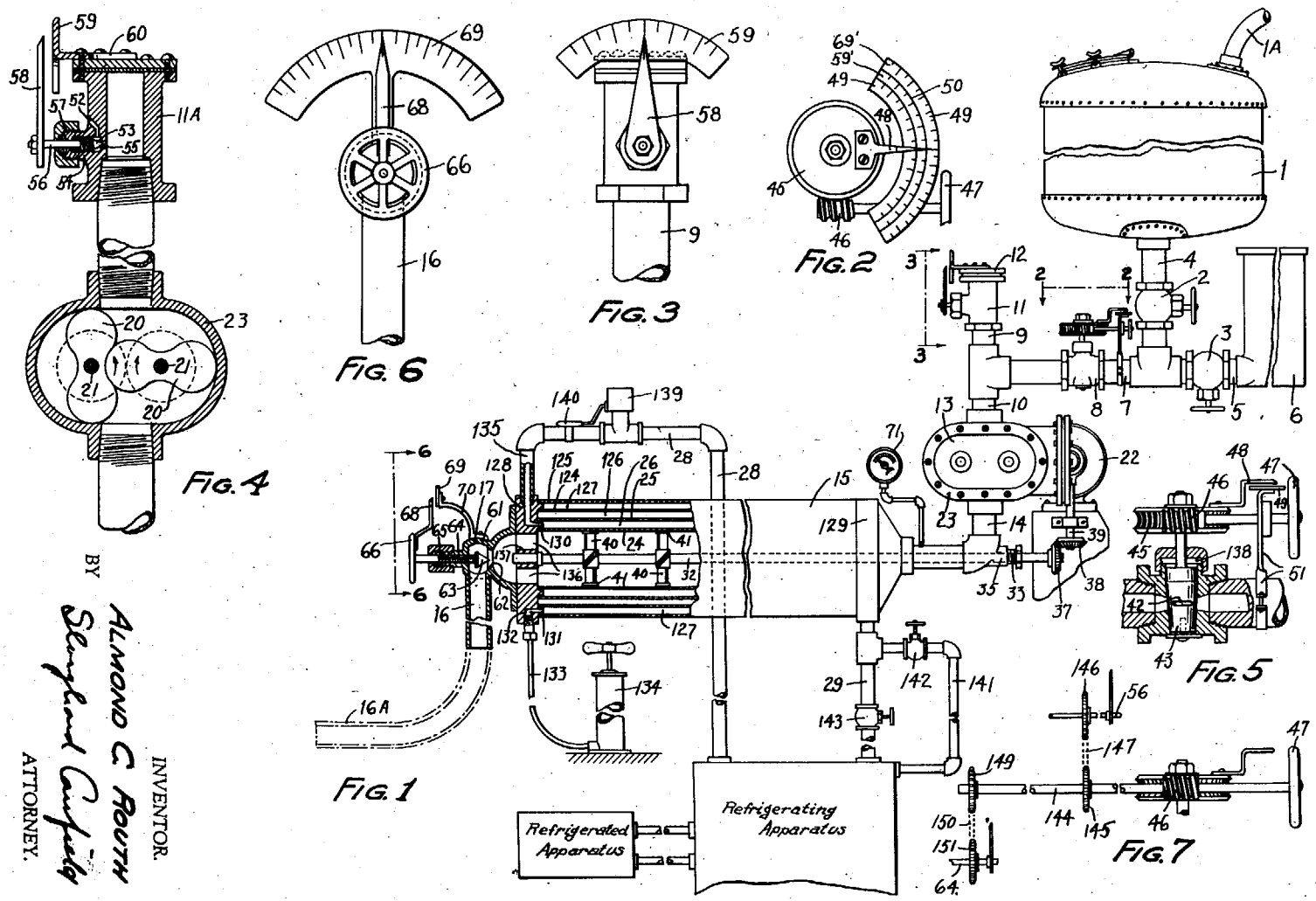
INVENTOR.
ALMOND C. ROUTH
BY Slaughland Canfield
ATTORNEY.

Reissued Jan. 24, 1939

Re. 20,987

UNITED STATES PATENT OFFICE 20,987

ICE CREAM MANUFACTURING APPARATUS

Almond C. Routh, Sandusky, Ohio

Original No. 2,067,683, dated January 12, 1937, Serial No. 53,782, December 10, 1935. Application for reissue May 7, 1937, Serial No. 141,357

21 Claims. (Cl. 62—114)

This invention relates to ice cream manufacturing methods and apparatus of the class in which liquid or plastic ice cream is continuously pumped or otherwise forced through a freezer and conduit means.

Ice cream during the manufacture thereof into saleable form is sometimes pumped or otherwise forced, either in liquid mix condition or in plastic mix condition, through a conduit system, and concurrently in a suitable freezing part of the system subjected to low temperature to chill it to form-sustaining hardness and is then ejected from the machine into cans or other containers for final hardening, or is extruded from a nozzle in the form of a continuous form-sustaining worm.

While the ice cream, whether in liquid or plastic mix form is being pumped through the conduit system in apparatus of this class, air is usually mixed therewith to give the desired palatability and consistency to the finished product. If, however, the ice cream flows too rapidly through that part of the system, subjecting it to low temperature to harden it, it will not harden sufficiently therein, and furthermore the air will not be properly incorporated therein. Conversely, if the ice cream flows too slowly, it may solidify in the refrigerating portion of the conduit system and block the same, stopping the flow altogether; and if it continues to flow but at too low a rate, the air supplied thereto may become excessive. Thus, in systems of this class heretofore proposed, regulating apparatus must be provided to control the speed of the pump to thereby control the flow rate through the system.

Again, it is often desirable to install ice cream making apparatus in a plant already equipped with a refrigerating system and apparatus and to utilize the same as means for freezing the ice cream; and it has heretofore been necessary in such cases to regulate the rate of freezing by means of additional refrigerator regulating apparatus, to prevent the freezing from taking place too slowly or too rapidly for a given rate of flow of ice cream.

Again, in some cases, when the ice cream is extruded in a worm, the worm flowing from the nozzle may not be a solid well-formed worm but may have unfilled cavities therein and may be generally loosely packed, and this defective condition of the extruded worm will vary with the rate of flow and rate of air admission above referred to.

Among the objects of my invention, therefore, are to provide in an apparatus of the class referred to:

Improved means for controlling the rate of flow of the liquid mix or plastic ice cream being forced through the freezer and the conduit means;

Improved means for controlling the rate of air admission to the ice cream or mix;

Improved means for controlling the density or compactness of the ice cream in the extruded worm;

Improved means whereby the rate of mix flow, rate of air admission, and the compactness of frozen product may each be adjustably changed or controlled in coordination with each other;

An improved method and means for continuously producing from a liquid mix, ice cream in a compact form-sustaining worm of controlled predetermined hardness and with a predetermined controlled proportion or "overrun" of air incorporated therein;

Another object is to provide, in an ice cream freezing method and means of the class in which ice cream mix is pumped through the system by a constant speed pump and frozen by a predetermined constant freezing temperature, improved means for controlling and regulating the consistency of the frozen ice cream;

Other objects are:

To provide improved means whereby with a single constant speed motor, ice cream may be produced of predetermined uniform consistency even under conditions of variation of freezing temperature and ice cream formula;

To provide improved means adapting a given apparatus to a great range of output in gallons per minute, and to a great range of mix freezing temperature.

Other objects will be apparent to those skilled in the art to which my invention appertains.

My invention is fully disclosed in the following description taken in connection with the accompanying drawing, in which:

Fig. 1 is a side elevational view of an apparatus embodying my invention;

Fig. 2 is a fragmentary plan view taken from the plane 2—2 of Fig. 1;

Fig. 3 is a fragmentary elevational view taken from the plane 3—3 of Fig. 1;

Fig. 4 is a view illustrating in longitudinal section and to an enlarged scale a part of Fig. 1;

Fig. 5 is a view illustrating in longitudinal section and to an enlarged scale a part of Fig. 1;

Fig. 6 is a fragmentary elevational view taken from the plane 6—6 of Fig. 1; and Fig. 7 is a view illustrating a modification of certain control means illustrated in Fig. 1.

Referring to the drawing, I have shown at 1 a reservoir or tank containing liquid ice cream mix which may be supplied thereto through a pipe 1A from suitable mixing apparatus (not shown). The reservoir 1 communicates at a lower portion thereof with a conduit 4 controlled by a valve 2 and branching into conduit portions 5 and 7. The conduit portion 5 opens into an auxiliary reservoir 6 and is controlled by a valve 3.

The conduit portion 7 connects with a pair of branches 9 and 10, the branch 9 having an air inlet valve 11 associated therewith to be described, the outer end 12 of the conduit portion 9 being closed, and the conduit portion 10 being the intake conduit of a pump 13 discharging into a pump discharge conduit portion 14 communicating with one end of a freezer 15 the other end of which is connected to a freezer discharge conduit portion 16 through a control valve 17. The conduit portion 16 as shown in solid line may discharge into a can or other receptacle to contain the ice cream for further hardening and commercial distribution, or as shown in dotted lines, may terminate in a horizontal nozzle 16A from which the ice cream may be extruded in the form of a worm and by various fabricating apparatus hardened and converted into saleable pieces.

The pump 13 may be of any suitable or known construction but I prefer to employ a pump of the positive displacement type. One form of such pump is illustrated in the drawing in cross-section in Fig. 4 and is of the double impeller type having a pair of involute or like intermeshed impellers 20—20 supported on rotatable shafts 21—21 rotated by means of an electric or other motor 22 and enclosed in a pump housing 23 (see Figs. 1 and 4). Such impeller pumps are well known and need not be further described herein; and as is well known, such pumps create a positive suction or partial vacuum on the intake side thereof, for example, in the conduit portion 10, and create a positive pressure on the discharge side, for example in the conduit portion 14. The motor 22 preferably drives the pump at a constant speed, this being one of the advantages of my invention, and the control apparatus for controlling the speed of the motor, and in some cases auxiliary pumps and motors, as required in some prior systems, are unnecessary in the apparatus described here as will hereinafter appear.

The freezer 15, while it may be variously constructed, comprises, in the form illustrated, an inner sheet metal cylindrical wall 24 through which the mix being frozen flows, surrounded by a cylindrical sheet metal wall 25 spaced therefrom, thus providing a chamber 26 for the circulation of brine or other refrigerant around the cylinder 24 to chill the same to freezing temperature. Surrounding the two main walls 24 and 25 are two other cylindrical walls 124 and 125 thus providing an air-containing insulating space 126 between the walls 25 and 124 and an insulating vacuum chamber or space 127 between the two outer walls 124 and 125. The walls are all clamped between end heads 128 and 129, each cylindrical wall being pressed around the outside or pressed within the inside, as the case may be, of annular tapered beads 130 and 131 as shown for the head 128, the other head having similar beads not shown. The chambers are by this means all sealed at their ends.

A passageway 132 is provided communicating with the chamber 127 and externally with a pipe 133 by which, through the agency of a vacuum pump 134, vacuum may be produced in the chamber 127.

A passageway 135 in the head 128 leads from the refrigerant chamber 26 to a circulating pipe 28, and a like pipe 29 communicates through the opposite head 129 (which may be similar to the head 128) with the chamber 26. The pipes 28 and 29 may be connected to any refrigerating apparatus not shown which in many cases will be a refrigerating plant already installed and being used for other purposes. It therefore may be the case that the temperature available at the freezer 15, which of course is the freezing temperature available to freeze the mix into ice cream in the freezer, may be dictated, not by the freezer and its requirements, but by the other apparatus supplied by the same refrigerating plant. As will be apparent hereinafter, my invention has particular advantages in such cases.

In general, of course, the temperature at which the freezer 15 is maintained by the refrigeration referred to must be a temperature sufficiently low to freeze the ice cream mix flowing therethrough into plastic ice cream in the chamber or cylinder 24, and preferably to render it of form-sustaining hardness so that it may, if desired, be extruded from the nozzle 16*a* in a continuous form-sustaining worm of the cross-sectional shape of the nozzle.

The ice cream mix, as will now be apparent, is caused to flow from the pump 13 through the conduit portion 14 and chamber within the cylinder 24, conduit portion 16, valve 17 and out through the conduit portion 16. The heads 128 and 129 are provided with passageways 136—136, therefore being in the form of spiders having central portions in which, as shown for the head 128, sleeve bearings 137 may be provided.

While in the chamber 24, the ice cream may be continuously agitated by an agitating means comprising a rotatable shaft 32 rotating in the bearing sleeves 137—137, the shaft terminating at the head 138 as shown in the drawing and at the opposite end extending out through the head and through and out of the conduit portion 14. That end of the shaft may be sealed by a gland 33 on a suitable boss 35 through which the shaft extends. Beyond the gland 33, the shaft carries a bevel gear 37 with which is meshed a corresponding bevel gear 38 mounted on a generally vertically disposed shaft 39, the upper end of which is connected to the motor 22 in any suitable manner or through any suitable speed reduction gearing to be rotatably driven thereby whereby power from the motor may rotate the shaft 32.

Interiorly of the chamber 24, the shaft 32 is provided with a plurality of axially spaced beaters 40—40 which may be provided with scrapers 41—41 to scrape upon the inner cylindrical wall of the chamber 24 and remove ice cream therefrom tending to freeze thereon and to agitate it and mix it with the body of the ice cream moving through the chamber. By this means, which corresponds in form and function to the well known batch type ice cream freezer, the ice cream passing through the chamber may be uniformly hardened to the predetermined form-sustaining temperature referred to.

The pressure in the conduit portion 14 may be indicated on a pressure gauge 71 of any suitable construction.

A valve 8 is provided in the conduit portion 7 and throttles or restricts the flow of ice cream mix therethrough to the pump 13. The valve 8 may be of any suitable construction. In the form illustrated, Figs. 1 and 5, being of the spigot type comprising a tapering cone-shaped valve element 43 having therethrough a relatively thin slot-like passageway, which, upon rotation of the valve element 43, adjustably, will variably restrict the flow through the conduit portion 7 in a well known manner. The valve element 43 may have a stem extending outwardly through the conduit wall through a gland 138 and has a worm gear 45 thereon. A worm 46 meshed with the worm gear has a handle 47 thereon to turn the worm to adjust the valve.

Thus, for given amounts of rotary movement of the hand wheel 47, the valve element will be rotated with a very great reduction of movement so that the valve port 42 can be adjusted very sensitively. To indicate visibly the position of the valve or the size of the opening of the port 42, a dial finger 48 is provided on the worm gear 45 and a dial 49 having a position-indicating scale 50 thereon is supported by a bracket 51 on the conduit 7. If desired, to cause the scale to be uniform, the port 42 in the valve element 43 may be correspondingly shaped as is well understood by those skilled in the art.

With an apparatus of the class above described, comprising the freezing and hardening chamber 24, if the ice cream flows to and through the chamber 24 at too great a rate, it will not be hardened sufficiently, and due to the relatively short time that the ice cream remains in the chamber 24, the air will not be thoroughly incorporated therein. Again, if the ice cream moves too slowly through the chamber 24, it may harden so rapidly as to become substantially solid and prevent rotation of the shaft 32 by the motor 22 and stop the process.

As stated above, an air inlet valve 11 is provided. It is common practice in the manufacture of ice cream for various purposes such as to improve the unpalatability thereof to mix or incorporate into the ice cream a certain amount of air. Inasmuch as this increases the volume of the mass, it is known in the art as "over-run". In order that the correct amount of air shall be admitted and accurately controlled, I provide the following means illustrated particularly in Figs. 1 and 4.

The housing 11A of the valve 11 is provided with an air inlet duct 52 and a valve seat 53 therein. A boss 54 is formed on the outside of the housing 11A and a longitudinally movable valve 55 is threaded therein having a needle point controlling the valve seat 53. The stem 56 of the needle valve is packed by a gland packing 57 which may be of well known construction. Secured to the valve stem externally of the gland is a dial finger 58 which, upon rotating the needle valve, may be moved back and forth over a dial 59 having a position-indicating scale thereon, the dial being secured by a bracket 60 to the housing 11A.

The effective size of the duct 52 may be varied by rotating the valve 55 and the size of the opening may be indicated by the dial finger 58 on the dial 59. The suction of the pump 13 draws air through the duct and the pump mixes the air with the liquid ice cream. The air is further incorporated and mixed with the ice cream by the agitation above described occurring in the chamber 24.

By means of my invention above described, both the rate of flow and the overrun may be controlled and by means of the indicating scales which indicate the positions or adjustments of the valves, they may with no difficulty be kept in corresponding adjustment. For example, if the valve 8 is adjusted to any given rate of flow, the dial finger 48 will indicate a certain definite scale point on the dial 49 and the dial 59 may be calibrated with respect to the dial 49 so that its indicating dial finger 58 may be at once moved to a point on the dial 59 corresponding to the said point on the dial 49, and thus the overrun can be instantly readjusted for any adjustment of the valve 8 at any time without experimentation.

Thus it will be apparent that for any given set of conditions including the recipe used for making the ice cream mix, the temperature of the ice cream when it arrives at the chamber 24, the pumping characteristics of the pump, and any changes which may occur from time to time therein, there will be a certain predetermined quality, hardness and texture of ice cream extruded from the nozzle; and I find that the desired quality may be maintained by controlling the rate of flow. This is accomplished by adjusting the valve 8 to reduce or increase the rate at which the liquid ice cream may be permitted to flow to the pump 13. Likewise, for any change of flow rate of ice cream effected by the valve 8, the valve 11 may be correspondingly adjusted to correspondingly vary the amount of air admitted because for each rate of flow there will be an ideal "overrun".

The valve 17, above referred to in the conduit portion 16 comprises a housing 61 having therein a valve port 62 partly closed by a cone valve 63, thus providing some restriction in the conduit line and resistance to flow of the frozen ice cream. By this means the ice cream is compacted or condensed or held back by a predetermined amount to insure that the ejected ice cream will be of the proper consistency and to establish in the freezer 15 at least a minimum pressure to insure proper agitation of the material therein and incorporation of the air thereinto. The valve 63 may be adjusted to vary the restriction by varying the size of the valve port 62, to this end the valve having a threaded stem 64 thereon extending outwardly through a gland 65 in the wall of the housing 61. A hand wheel 66 is provided to turn the stem to adjust the valve.

By this means, the ice cream may be compacted just before it reaches the nozzle 16A so that when it is extruded in the form of a worm, the worm will be a solid well-filled worm without breaks, cavities or the like.

It has been found by experience that the ideal back pressure or opposition effected by the valve 17 depends upon the rate of flow at which the ice cream flows through the freezer 15 and upon the beating thereof by the agitating elements 40 and 41 which obviously will be prolonged if the rate of flow is slow and vice versa.

It therefore becomes desirable to adjust the opposition of the flow opposing valve 17 in accordance with changes in the adjustment in the rate of flow. In order that this may be effected immediately and without experimentation, a dial finger 68 is mounted on the hand wheel 66 and moves over a scale 69 supported on a bracket 70 on the housing 61; and as will now be understood from the more complete description hereinbefore of the air intake valve, the dial 69 may be calibrated initially by experimentation, and in respect to the dials 49 and 59 so that for any position of the dial finger 48 on the dial 49 of the flow controlling valve, the dial 49 will indicate a corresponding position on the dial 69 for the dial finger 68.

For convenience, the dial 49 of the flow controlling or obstructing valve, may be provided with three dials, one the dial 49 indicating the position of the flow control valve 8 itself; another, 59', being a reproduction of the dial 59; and the third, 69', being a reproduction of the dial 69. By this arrangement, whenever the flow control valve 8 is adjustably moved, its dial finger 48 will indicate on the dials 59' and 69' the adjustment to which the dial fingers 58 and 68 should be moved to correspond.

As will now be apparent, the final result desired is an extruded worm from the nozzle 19 which will be of a suitable degree of form-sustaining hardness, and which will be compacted and full, and which will have the desired amount of overrun therein. The compactness may be controlled by the valve 17, the overrun by the valve 11, and the degree of hardness by the valve 8; and while the scales indicating the positions of these three valves are not absolutely essential in the practice of my invention, they greatly improve and facilitate the operation of the system and enable the corresponding adjustment of the three valves to be effected quickly, efficiently and without loss by experimental or cut-and-try methods.

In the foregoing description, I have particularly described my invention as applicable to producing a suitable form-sustaining worm from liquid ice cream mix. It will be apparent that my invention may be practiced with plastic ice cream introduced to the conduit 4 instead of liquid mix. In such use of my invention, the tank 1 would be replaced by a reservoir suitable to receive a batch of plastic ice cream which had been partly frozen in a suitable ice cream freezing machine; or the plastic ice cream frozen sufficiently to render it of plastic condition may be fed to the tank 1 through the conduit 1A. From that point on, the plastic ice cream will flow through the system as described above for liquid mix. In such case, the plastic ice cream will be hardened in the chamber 24 and the air will be mixed therewith partly in the pump 23 and partly in the chamber 24. In such case, since the ice cream is already partly frozen, it may flow through the chamber 24 at a higher rate than in the first described case and the valve 8 may correspondingly be adjusted to a wider opening and the scales on the several instruments may be calibrated to correspond to such greater opening of the valve 8 in a manner that will now be understood.

The auxiliary tank 6 may be used when it is desired to run a sample or special batch of ice cream through the apparatus as distinguished from the continuous production obtained when the tank 1 is utilized, continuously supplied through the conduit 1A. To utilize the auxiliary tank 6, it will be understood that the valve 2 may be closed and the valve 3 opened and vice versa.

As will now be apparent, the valve 8 can be adjusted for a rate of flow in accordance with the temperature at which the refrigerating system will maintain the freezer 15, so that whatever the temperature of the freezer may be, the apparatus may be quickly adjusted to produce frozen ice cream of the desired consistency and hardness. A given set of apparatus parts, therefore, as above described may be manufactured and installed in various plants having refrigerating apparatus and can produce ice cream at a high rate if the plant can supply a large degree of refrigeration or at a slow rate if its refrigeration available is limited. For example, I have found that with a freezer having a freezing chamber approximately 7" inside diameter and 30" long, and with a corresponding size of motor and pump, it can be adjusted to deliver frozen ice cream at rates varying from 50 to 300 gallons per hour, depending as above described upon the temperature of refrigeration available at the freezer. A great flexibility of the apparatus is therefore provided by the controls above described, and this is accomplished as aforesaid with a single constant speed motor.

I have found that even when the available refrigeration will produce a temperature in the refrigerant chamber 26 as high as 0° F. to −5° F., ice cream can still be produced with this apparatus whereas heretofore in well known constructions of apparatus, a temperature as low as −15° F. to −20° F. have been essential to produce ice cream at all, because such machines have not been constructed to adjust the flow rate, air admission, and back pressure to the temperature available.

As stated above, no regulation of temperature is necessary. In refrigerating plants supplying refrigeration for ice cream freezing with the above described apparatus incidental to the other uses of the refrigerating plant, changes of temperature at the freezer 15 will occur slowly or gradually and an attendant at the apparatus can detect changes in the ejected ice cream and correspondingly change the adjustment of the controls to maintain a uniform consistency of ice cream. But if desired, a temperature regulator may be employed in the line of the pipe 28 as indicated at 139. This regulator may comprise a sylphon-operated valve controlled by a bulb 140 in thermal engagement with the conduit 28 to control the flow of refrigerant therethrough to maintain the temperature constant. Such control valves are so well known in the art that no description or illustration thereof other than that referred to is deemed necessary.

If due to any unforeseen cause or to lack of proper supervision, the flow rate should be decreased and the temperature should fall so that the ice cream in the freezer 15 should freeze solid and stop the machine, it may again be thawed out and started in the following manner. A pipe 141 connected to the "hot" side of the refrigerating system, may, upon opening the valve 142 closing the valve 143 in the pipe 29, admit "hot" refrigerant to the chamber 26 and back through the pipe 28 to quickly raise the temperature of the ice cream in the freezer 15; and after it has thawed and the apparatus has started again, the valve may be reversely operated to restore the normal refrigeration to the freezer.

As a modified form of adjusting the controls above described, the arrangement shown in Fig. 7 may be employed. The shaft of the worm 46 may be extended as shown at 144 and may be provided with a sprocket wheel 145 on the end thereof. The stem 56 of the needle valve 55 may have a sprocket wheel 146 thereon connected to the sprocket wheel 145 by a chain 147. The extension 144 may have a sprocket wheel 149 on the end thereof connected by a sprocket chain 150 with the sprocket wheel 151 on the stem 64 of the valve 17. By this construction when the handle 47 of the valve 8 is adjustably turned, it will correspondingly adjust the other two valves. By suitable ratios of the bevel sprocket wheels, the adjustable settings of the air valve and back pressure valve may be made corresponding in each case to the setting of the flow valve so that when the flow valve is changed the other two valves are automatically correctly changed.

When this arrangement is employed it will be apparent that the entire apparatus may be adjusted by a single hand wheel 47 to cause it to produce ice cream of the desired hardness for any temperature which may occur at the freezer, and for a given apparatus for any temperature available in any plant where it may be installed.

It will be understood, of course, that the bare parts and conduits illustrated may be heat-insulated and that the various pipes and conduit joints may be of the sanitary type adapted to be readily taken apart to be cleaned, such elements being well known in the art.

My invention is not limited to the exact details of construction illustrated and described. Many changes and modifications may be made within the scope and spirit of my invention without sacrificing its advantages and within the scope of the appended claims.

I claim:

1. In a continuous ice cream manufacturing apparatus, a continuous supply source of ice cream mix, a positive displacement pump, a power source for driving the pump at constant speed, a freezer having a discharge outlet, interconnecting conduit means whereby the mix may be continuously pumped from the supply source through the freezer and discharged in frozen consistency from the outlet, a source of refrigerant at variable temperature, means to refrigerate the freezer therefrom to variable freezing temperature, a flow restricting valve between the mix source and the pump on the intake side thereof adjustable to commensurate the rate of mix flow to the freezer temperature to cause the discharged ice cream to be of substantially the same frozen consistency at all freezer temperatures.

2. In a continuous ice cream manufacturing apparatus, a continuous supply source of ice cream mix, a positive displacement pump, a power source for driving the pump at constant speed, a freezer having a discharge outlet, interconnecting conduit means whereby the mix may be continuously pumped from the supply source through the freezer and discharged in frozen consistency from the outlet, a source of refrigerant at variable temperature, means to refrigerate the freezer therefrom to variable freezing temperature, a flow restricting valve between the mix source and the pump on the intake side thereof adjustable to commensurate the rate of mix flow to the freezer temperature to cause the discharged ice cream to be of substantially the same frozen consistency at all freezer temperatures, and an air admission valve for admitting air into the conduit means on the suction side of the pump and comprising means for adjustably fixing the rate of air admission.

3. In a continuous ice cream manufacturing apparatus, a continuous supply source of ice cream mix, a positive displacement pump, a power source for driving the pump at constant speed, a freezer having a discharge outlet, interconnecting conduit means whereby the mix may be continuously pumped from the supply source through the freezer and discharged in frozen consistency from the outlet, a source of refrigerant at variable temperature, means to refrigerate the freezer therefrom to a variable freezing temperature, a flow restricting valve between the mix source and the pump on the intake side thereof adjustable to commensurate the rate of mix flow to the freezer temperature to cause the discharged ice cream to be of substantially the same frozen consistency at all freezer temperatures, an air admission valve for admitting air into the conduit means on the suction side of the pump and comprising means for adjustably fixing the rate of air admission, and a flow restricting port on the conduit means between the freezer and the outlet for creating back pressure in the conduit means and means for adjustably fixing the area of the restricting port.

4. In a continuous ice cream manufacturing apparatus, a source of supply of ice cream mix, a positive displacement pump, a power source for driving the pump at constant speed, a freezer having a discharge outlet, interconnecting conduit means whereby the mix may be pumped from the supply source through the freezer and discharged in frozen consistency from the outlet, a source of refrigerant, means to refrigerate the freezer from the source, a flow restricting valve between the mix source and the pump on the intake side thereof to adjust the rate of flow of the mix to determine the frozen consistency of the discharged ice cream.

5. In a continuous ice cream manufacturing apparatus, a source of supply of ice cream mix, a positive displacement pump, a power source for driving the pump at constant speed, a freezer having a discharge outlet, interconnecting conduit means whereby the mix may be pumped from the supply source through the freezer and discharged in frozen consistency from the outlet, a source of refrigerant, means to refrigerate the freezer from the source, a flow restricting valve between the mix source and the pump on the intake side thereof to adjust the rate of flow of the mix to determine the frozen consistency of the discharged ice cream, and an air admission valve for admitting air to the intake side of the pump and means to adjustably fix the rate of air admission.

6. In a continuous ice cream manufacturing apparatus, a source of supply of ice cream mix, a positive displacement pump, a power source for driving the pump at constant speed, a freezer having a discharge outlet, interconnecting conduit means whereby the mix may be pumped from the supply source through the freezer and discharged in frozen consistency from the outlet, a source of refrigerant, means to refrigerate the freezer from the source, a flow resticting valve between the mix source and the pump on the intake side thereof to adjust the rate of flow of the mix to determine the frozen consistency of the discharged ice cream, and an air admission valve for admitting air to the intake side of the pump and means to adjustably fix the rate of air admission, and a restriction port in the conduit means between the freezer and the discharge outlet for creating back pressure in the conduit means, and means to adjustably fix the area of the restriction port.

7. In an ice cream continuous freezing apparatus, a freezer having a discharge outlet, a positive displacement pump, a power source for driving the pump at constant speed, a source of liquid mix, interconnecting conduit means whereby liquid mix may be continuously pumped from the source through the freezer and out at the outlet, means for refrigerating the freezer to cause the discharged ice cream to be of frozen consistency, a flow rate valve between the pump and the source for adjustably restricting the rate of flow, an air admission valve on the intake side of the pump for admitting air from the atmosphere, and adjustable to fix the rate of admission, a flow restriction valve between the freezer and the discharge outlet for creating back pressure in the conduit means and adjustable to fix the amount of restriction, and determining means to cause a setting of the flow rate control valve to determine a corresponding independent setting of the air admission valve and the back pressure valve, said setting indicating means comprising indicating scales on the flow control valve indicating corresponding settings for the air admission valve and the back pressure valve, and position indicating scales for said air admission valve and back pressure valve by which they may be independently set to said indicated positions.

8. In an ice cream continuous freezing apparatus, a freezer having a discharge outlet, a positive displacement pump, a power source for driving the pump at constant speed, a source of liquid mix interconnecting conduit means whereby liquid mix may be continuously pump from the source through the freezer and out at the outlet, means for refrigerating the freezer to cause the discharged ice cream to be of frozen consistency, a flow rate valve between the pump and the source for adjustably restricting the rate of flow, an air admission valve on the intake side of the pump for admitting air from the atmosphere, and adjustable to fix the rate of admission, a flow restriction valve between the freezer and the discharge outlet for creating back pressure in the conduit means and adjustable to fix the amount of restriction, and mechanical interconnections between the said flow rate valve, air admission valve and back pressure valve whereby upon adjustably setting the flow rate valve, the air admission valve and back pressure valve will be correspondingly adjustably set.

9. The apparatus described in claim 4 and in which the freezer comprises an agitator driven by the power source at constant speed.

10. The apparatus described in claim 5 and in which the freezer comprises an agitator driven at constant speed by the power source.

11. In a continuous material congealing apparatus, a source of supply of liquid or semi-liquid material to be congealed, a positive displacement pump, a power source for driving the pump at constant speed, a congealing apparatus comprising a chamber having a discharge outlet, interconnecting conduit means whereby the material may be pumped from the supply source through the chamber and discharged in congealed consistency from the outlet, a source of refrigerant, means to refrigerate the chamber from the refrigerant source, a flow restricting valve between the material source and the pump on the intake side thereof to adjust the rate of flow of the material to determine the hardness of the discharged congealed material.

12. In a continuous material congealing apparatus, a source of supply of liquid or semi-liquid material to be congealed, a positive displacement pump, a power source for driving the pump at constant speed, a congealing apparatus comprising a chamber having a discharge outlet, interconnecting conduit means whereby the mix may be pumped from the supply source through the chamber and discharged in congealed consistency from the outlet, a source of refrigerant, means to refrigerate the chamber from the refrigerant source, a flow restricting valve between the material source and the pump on the intake side thereof to adjust the rate of flow of the material to determine the hardness of the discharged congealed material, and an air admission valve for admitting air to the intake side of the pump and means to adjustably fix the rate of air admission.

13. In a continuous material congealing apparatus, a source of supply of liquid or semi-liquid material to be congealed, a positive displacement pump, a power source for driving the pump at constant speed, a congealing apparatus comprising a chamber having a discharge outlet, interconnecting conduit means whereby the mix may be pumped from the supply source through the chamber and discharged in congealed consistency from the outlet, a source of refrigerant, means to refrigerate the chamber from the refrigerant source, a flow restricting valve between the material source and the pump on the intake side thereof to adjust the rate of flow of the material to determine the hardness of the discharged congealed material, and an air admission valve for admitting air to the intake side of the pump and means to adjustably fix the rate of air admission, and a restriction port in the conduit means between the chamber and the discharge outlet for creating back pressure in the conduit means, and means to adjustably fix the area of the restriction port.

14. The apparatus described in claim 11 and in which the congealing apparatus comprises an agitator in the chamber driven by the power source at constant speed.

15. The apparatus described in claim 12 and in which the congealing apparatus comprises an agitator in the chamber driven at constant speed by the power source.

16. In a continuous material congealing apparatus, a source of supply of liquid or semi-liquid material to be congealed, a positive displacement pump, a power source for driving the pump, a congealing apparatus comprising a chamber having a discharge outlet, interconnecting conduit means whereby the material may be pumped from the supply source through the chamber and discharged in congealed consistency from the outlet, a source of refrigerant, means to refrigerate the chamber from the refrigerant source, a flow restricting valve between the material source and the pump on the intake side thereof to adjust the rate of flow of the material to determine the hardness of the discharged congealed material.

17. In a continuous material congealing apparatus, a source of supply of liquid or semi-liquid material to be congealed, a pump, a power source for driving the pump at constant speed, a congealing apparatus comprising a chamber having a discharge outlet, interconnecting conduit means whereby the material may be pumped from the supply source through the chamber and discharged in congealed consistency from the outlet, a source of refrigerant, means to refrigerate the chamber from the refrigerant source, a flow restricting valve between the material source and the pump on the intake side thereof to adjust the rate of flow of the material to determine the hardness of the discharged congealed material.

18. The apparatus described in claim 16 and in which the congealing apparatus comprises an agitator in the chamber driven by the power source.

19. The apparatus described in claim 17 and in which the congealing apparatus comprises an agitator in the chamber driven by the power source at constant speed.

20. In a continuous material handling apparatus, a continuous source of supply of fluid material, a pump, a power source for driving the pump, refrigerating apparatus having a discharge outlet, inter-connecting conduit means whereby material may be pumped from the supply source through the said refrigerating apparatus and discharged in a state of increased consistency from the outlet, a source of refrigerant, means to communicate said refrigerant to the refrigerating apparatus to lower its temperature, flow restricting means between the material source and the pump to adjust the rate of flow of the material to regulate the consistency of the discharged material.

21. In a continuous material handling apparatus, a continuous source of supply of fluid material, a pump, a power source for driving the pump at substantially constant speed, refrigerating apparatus having a discharge outlet, interconnecting conduit means between the supply source and refrigerating apparatus whereby the material may be pumped from the supply source through the refrigerating apparatus and discharged in a state of increased consistency from the outlet, a source of refrigerant, means to communicate said refrigerant to the refrigerating apparatus to lower its temperature, and flow restricting means between the material source and pump to adjust the rate of flow of the material to regulate the consistency of the discharged material.

ALMOND C. ROUTH.